(12) United States Patent
Nagel et al.

(10) Patent No.: US 8,904,282 B2
(45) Date of Patent: Dec. 2, 2014

(54) ELECTRONIC DEVICE HAVING CAPABILITY FOR INTERPRETING USER INPUTS AND METHOD THEREFOR

(75) Inventors: Jens Nagel, San Francisco, CA (US); Heiko K. Sacher, Menlo Park, CA (US)

(73) Assignee: Motorola Mobility LLC, Libertyville, IL (US)

( * ) Notice: Subject to any disclaimer, the term of this patent is extended or adjusted under 35 U.S.C. 154(b) by 1880 days.

(21) Appl. No.: 11/111,415

(22) Filed: Apr. 21, 2005

(65) Prior Publication Data
US 2006/0242576 A1 Oct. 26, 2006

(51) Int. Cl.
*G06F 17/00* (2006.01)
*G06F 3/01* (2006.01)
*G06F 3/023* (2006.01)

(52) U.S. Cl.
CPC .............. *G06F 3/0236* (2013.01); *G06F 3/018* (2013.01)
USPC .......................................... 715/261; 715/264

(58) Field of Classification Search
USPC ......... 715/531, 532, 773, 816, 823, 256, 259, 715/261, 264
See application file for complete search history.

(56) References Cited

U.S. PATENT DOCUMENTS

| | | | |
|---|---|---|---|
| 5,952,942 A * | 9/1999 | Balakrishnan et al. | 341/20 |
| 5,953,541 A * | 9/1999 | King et al. | 710/67 |
| 6,011,544 A * | 1/2000 | Sato | 345/168 |
| 6,204,848 B1 | 3/2001 | Nowlan et al. | |
| 6,307,548 B1 * | 10/2001 | Flinchem et al. | 715/811 |
| 7,165,019 B1 * | 1/2007 | Lee et al. | 704/2 |
| 7,228,267 B2 * | 6/2007 | Fux et al. | 704/3 |
| 2004/0177179 A1 * | 9/2004 | Koivuniemi | 710/67 |
| 2005/0144566 A1 * | 6/2005 | Zhang | 715/810 |
| 2006/0241933 A1 * | 10/2006 | Franz | 704/2 |

FOREIGN PATENT DOCUMENTS

WO        2001035249 A2     5/2001
WO     WO 03/081365 A2 * 10/2003

* cited by examiner

*Primary Examiner* — Adam M Queler
(74) *Attorney, Agent, or Firm* — Shumaker & Sieffert, P.A.

(57) ABSTRACT

An electronic device operates including a method for interpreting user input within an electronic device, the method comprising steps of receiving a first character via a user input (105), concurrently displaying a plurality of modal interpretations associated with the first character (110), selecting one of the plurality of modal interpretations (115), and displaying one of a first character result in response to the selection of the one of the plurality of modal interpretations (120).

18 Claims, 14 Drawing Sheets

ELECTRONIC DEVICE HAVING
CAPABILITY FOR INTERPRETING USER
INPUTS AND METHOD THEREFOR

FIELD OF INVENTION

The present invention relates to a method of interpreting a user input in an electronic device. More particularly, the present invention relates to a method of interpreting user inputs containing multiple mode content in an electronic device.

BACKGROUND OF THE INVENTION

The progress of technology has made it possible to reduce the size of circuitry within an electronic device such as a mobile telephone and a personal digital assistant. To take advantage of a compact circuit design by reducing the overall size of the electronic device can then restrict the size of external features of the electronic device such as a user interface for receiving user inputs. For example, when a user interface includes one or more user input keys, this limitation on the size of the user interface places a restriction on the number of keys that could be provided for entering a character sequence. As a result, the keys of the electronic device are generally overloaded with multiple characters, for example, in some electronic devices, a "2" key is responsible for the roman characters "a", "b" and "c", as well as the numeric character "2". Such overloading of keys would be for a specific mode of input such as a Roman language or a non-Roman language.

In an electronic device capable of processing multiple language inputs, switching between language modes is made possible by various methods, including the use of a hash (#) key. Therefore, when a user entering a mixed mode (i.e. mixed language) content wishes to switch from one mode to another, for example from a Roman language to a non-Roman language, the user would press the hash key, type the content in the non-Roman language and then by pressing the hash key again, return back to the Roman language. This process is to be repeated each time the user switches back and forth from one mode to another. Therefore, if the mixed mode content is such that the user has to switch frequently from one mode to another, the user would have to use the hash key repeatedly, though the hash key does not contribute to any mixed mode content.

Messages such as those exchanged between Chinese-speaking people oftentimes include multi-mode content. A user enters Chinese characters, numeric characters and English words or sentence fragments in the same message. This mixed-mode content requires the user to perform multiple mode switches.

Executing the mode switch is not only a relatively time consuming process but also associated with frequent usability problems. Novice users often have problems to find the right input mode to enter the desired character or get lost in a network of modal dependencies. Therefore, there is a need to facilitate entry of multi-mode content in a user-friendly manner.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
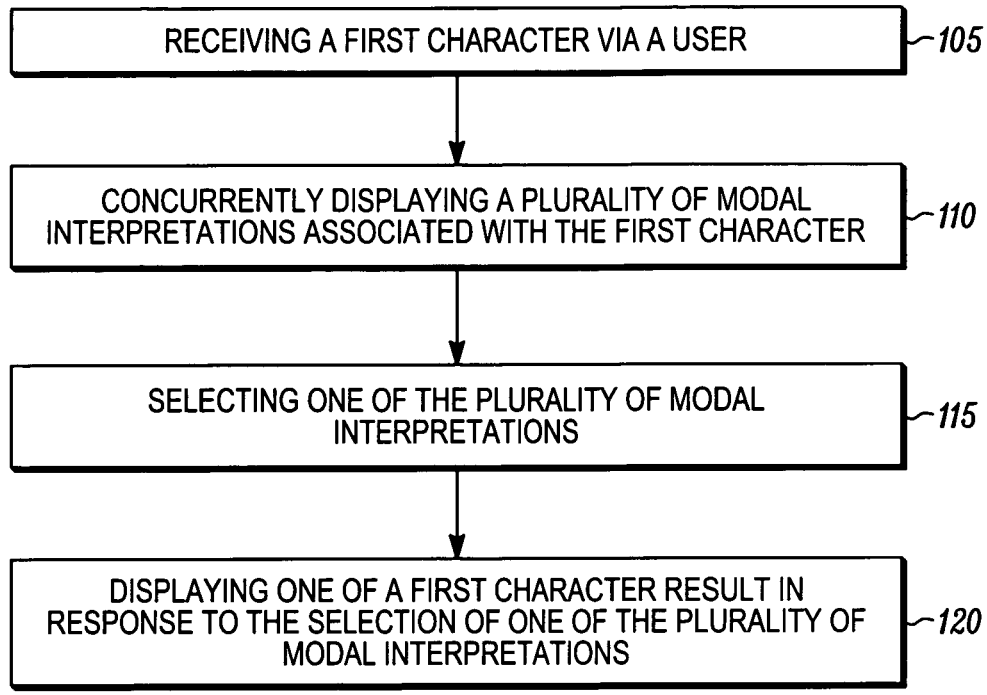
FIG. 1 illustrates an exemplary flowchart of a first embodiment of a method for interpreting user input in an electronic device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the method for interpreting user input in an electronic device in accordance with the present invention, it should be observed that the present invention resides primarily in combinations of method steps and apparatus components related to the method for interpreting user input in an electronic device. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated the method for interpreting user input in an electronic device described herein may be comprised of one or more conventional processors and unique stored program instructions that control the one or more processors to implement, in conjunction with certain non-processor circuits, some, most, or all of the functions of the method for interpreting user input in an electronic device described herein. The non-processor circuits may include, but are not limited to, a radio receiver, a radio transmitter, signal drivers, clock circuits, power source circuits, and user input devices. As such, these functions may be interpreted as steps of a method to perform the method for interpreting user input in an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention facilitates the entry of multi-mode content in an electronic device through a unique interpretation and method of display, wherein the user can select a specific modal content from the concurrently displayed multi-mode content. Pursuant to one embodiment, as shown in FIG. 1, a method for interpreting a user input in an electronic device begins with receiving a first character via a user input at Step 105. The electronic device includes a physical text input facility such as a keypad for receipt of the user input. A user provides the user input, which includes, for example, a keystroke on the keypad of the electronic device. Upon receiving the first character, the electronic device concurrently displays a plurality of modal interpretations associated with the first character at Step 110. The plurality of modal interpretations is preferably displayed on a display of the electronic device. The plurality of modal interpretations can include Roman script languages, such as English, a numeric character set, and/or can include non-Roman script languages. The user can configure the Roman and non-Roman languages according to which of the modal interpretations would be displayed.

According to one embodiment, there could be, for example, three modes displayed, wherein one of the modes includes a numeric character set. Those skilled in the art will appreciate that the number of modes can be configured to any number based on the number of modal interpretations that the user would like to view on the display. Further, the user input comprises a plurality of input methods for interfacing using the non-Roman language. The non-Roman language comprises one or more of a Chinese language, a Japanese language, a Korean language, an Indian language, a Farsi language and a Hebrew language, or an equivalent. When the non-Roman language comprises a Chinese language, the plurality of input methods can, for example, comprise one or more of a PinYin input method, a BoPoMoFo input method and a key-stroke input method. The user can configure the input method with the Chinese language.

The first item in the disambiguation bar is automatically selected after pressing a first character key. Alternatively, the user can manually select other displayed modal interpretations from the display. Once one of the modal interpretations has been selected at Step 115, the electronic device simultaneously displays a first character result in response to the selection of the one of the plurality of modal interpretations at Step 120. The first character result comprises one or more of a first plurality of character conversions, a first numeric string and a first plurality of word completions. The first character result can be displayed in a second display area of the display. The first plurality of character conversions comprises a set of characters corresponding to the selection of the one of the plurality of modal interpretations, when the one of the plurality of modal interpretations is a non-Roman language. The user can select the conversion characters from the second display area and commit them to the text window. In addition to the input methods, the electronic device comprises a provision for entering a plurality of tones when the input method is PinYin. In one embodiment, this could be done by pressing the key corresponding to the digit "0" (zero).

Corresponding to the Roman language, the electronic device provides a plurality of word completions in the second display area. This process saves the user the effort of entering a complete word, and the user can enter some initial characters of a word and select from the plurality of word completions the desired word. The numeric input can be replicated in the second display area as in the plurality of modal interpretations.

Pursuant to a further embodiment, the method further comprises the electronic device receiving a second character via the user input. Upon receiving the second character, the first character and the second character are interpreted together to generate a second character result, which is then displayed in the second display area of the display of the electronic device. The second character result comprises one of a second plurality of character conversions, a second numeric string and a second plurality of word completions, based on the selection of one of a modal interpretation corresponding to the interpretation of the first character and the second character. The interpretation of the first character and second character in combination results in a change to the content displayed in the first display area and the second display area. Furthermore, if the character entry has no valid disambiguation or interpretation, the change can include the removal of the non-Roman conversions, while retaining the numeric string, which would also change the mode of input to numeric or Roman character. On the other hand, if the second character key is a delete key, the character conversions that were removed due to the second character (as mentioned in the previous example), would re-appear and the default mode would be set to the non-Roman character. Those skilled in the art will appreciate that such character combinations as entered by the user can be continually interpreted by the electronic device and can result in corresponding changes to the first display area and the second display area. Some of such character combinations and changes are explained hereafter and shall not be considered exhaustive.

As described previously herein, the display in the electronic device preferably comprises a plurality of display areas, wherein the plurality of modal interpretations is displayed in the first display area of the display and one or more character conversions and/or word-completions in the second display area of the display. Although the invention operates using the first display area and the second display area, the requirements of the display with respect to screen resolution or otherwise are the same as in the case of a standard display. The display can be, for example, a liquid crystal display, a cathode ray tube display, a light emitting diode display, a plasma display or an equivalent.

According to a further embodiment, the method further comprises deriving the plurality of modal interpretations from a dictionary prior to displaying the plurality of modal interpretations. The dictionary comprises an adaptable part, which is user-extendable by entering new words using the standard Multi-Tap mode. The adaptable part of the dictionary stores and learns everything the user types on the device, while the static part of the dictionary contains a default list of words for a given language.

Figure 2:
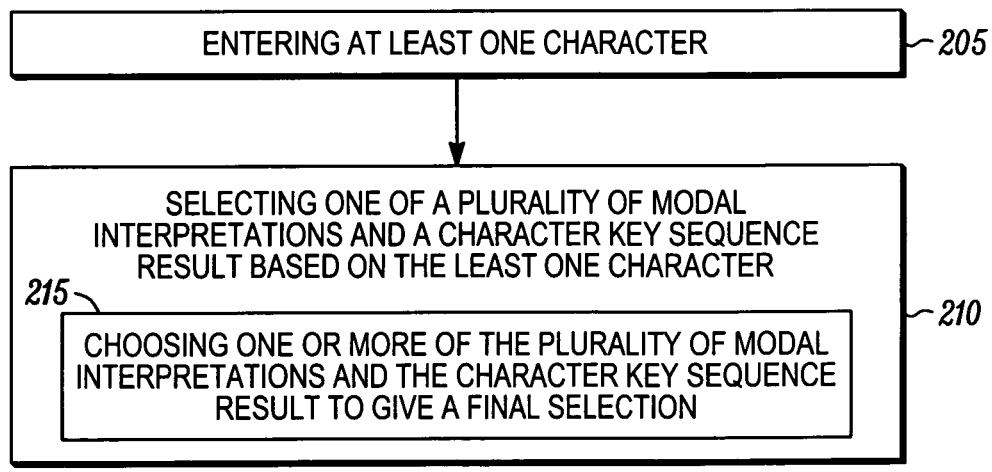
FIG. 2 illustrates an exemplary flowchart of a second embodiment of a method for entering multi-mode content in an electronic device.

According to a second embodiment as shown in FIG. 2, a method of entering multi-mode content in an electronic device begins with a user entering at least one character at Step 205. Upon entering one or more characters, the user selects one of a modal interpretation and a character key sequence result, based on the desired outcome at Step 210. The user can also set the mode for entering content by selecting from the plurality of modal interpretations, which are displayed. Selection comprises choosing one of a plurality of modal interpretations and a character key sequence result, to arrive at a final selection or desired outcome at Step 215. The character key sequence result can include, for example, one or more of a character conversion, a numeric string or of a word completion. The process or method, which facilitates multi-mode entry is described in further detail hereafter.

Figure 3:
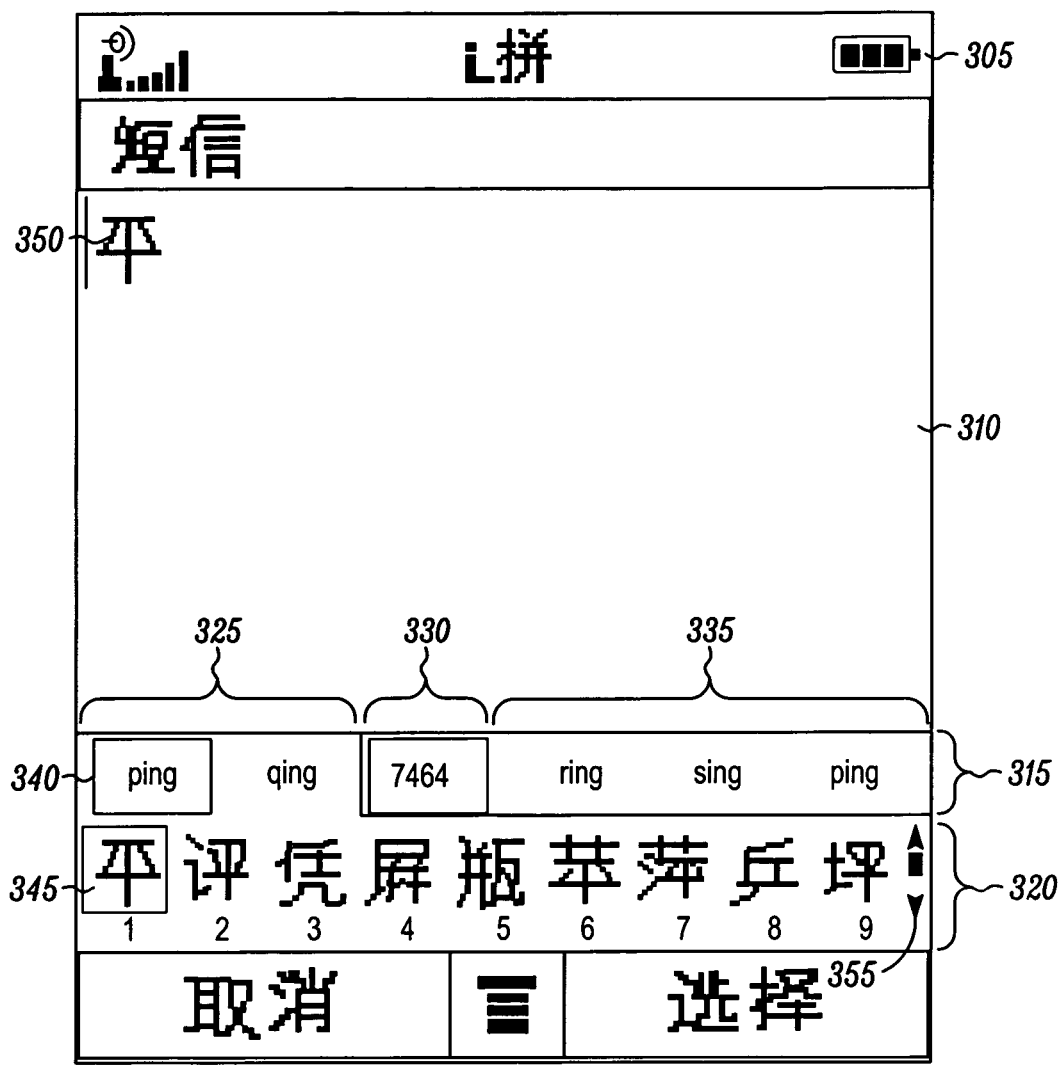
FIG. 3 illustrates an example of a screenshot of a display in an electronic device.

FIG. 3 illustrates an embodiment of a display 305 in an electronic device. The display 305 is divided into a plurality of text and display areas including a text area 310, a first display area 315 and a second display area 320. When a user enters a character sequence, for e.g. 7464, as shown, a plurality of modal interpretations 325, 330 and 335 are displayed in the first display area 315. Based on a default mode setting, one of the character strings 340 in one of the modal interpretations 325, is highlighted or selected by default to begin with. Based on this default setting, a character key sequence result is displayed in the second display area 320, and one of the first character key sequence results 345 is highlighted or selected by default. The same character key sequence result appears as a 'ghosted character' 350 or appears as a preview of the current selection in the text area 310. Only when the user confirms this character as his or her final selection, will the character appear to be confirmed in the text area 310.

Thus, an electronic device is designed to facilitate multi-mode content entry, without having to switch modes. The electronic device comprises a user interface, a display, and a processing unit, coupled between the user interface and the display, adapted to receive a user input via the user interface, cause a plurality of modal interpretations and a character key sequence result to be displayed on the display, receive at least one other user input via the user interface and process the at least one other user input to provide a selection between the plurality of modal interpretations and the character key sequence result, or cause a selection from the conversion bar to be committed to the text buffer.

Figure 4:
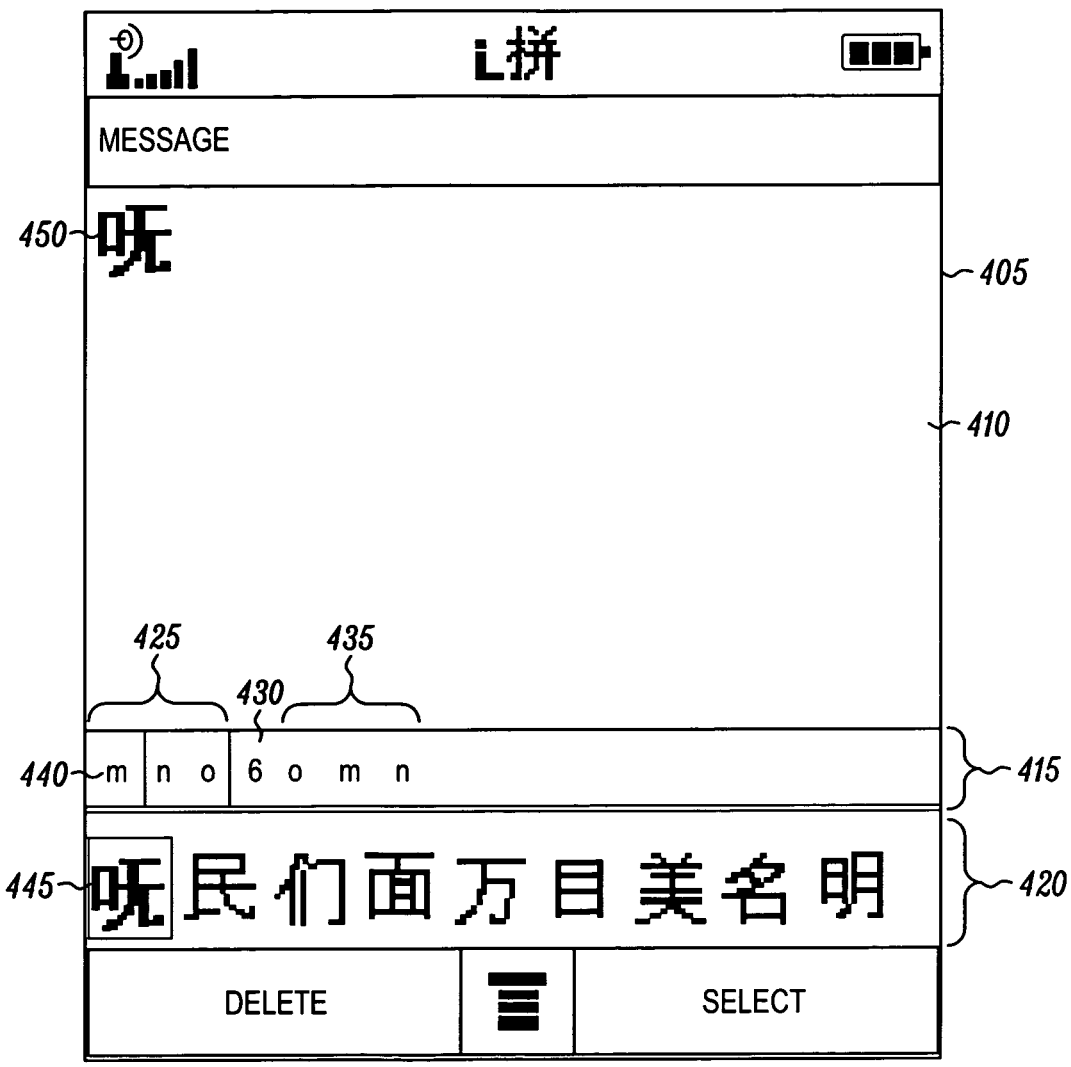
FIG. 4 illustrates an example of a screenshot of a display in an electronic device after adding one character in the electronic device.

FIGS. 4, 5, 6 and 7 show various embodiments of a process of dynamic addition and deletion of categories or characters in an electronic device. As shown in FIG. 4, when a user enters a single character by a keystroke on the number 6 key in this example, a display 405 displays a plurality of modal interpretations 425, 430, and 435 in a first display area 415 and a plurality of character key sequence results in a second display area 420. As illustrated in the example of FIG. 4, the first modal interpretation 425 is either a Pinyin input method or a BoPoMoFo input method or a key stroke input method corresponding to a Chinese language by default, and the first character 440 within the Chinese mode 425 is highlighted or selected by default. It will be appreciated by those of ordinary skill in the art that the method of modal interpretation in FIG. 4 is for exemplary purposes only, and that any user input method is within the scope of the present invention. A corresponding character conversion 445 or a character key sequence result is also highlighted or selected by default in the second display area. The same character conversion appears at a cursor prompt 455 in the text area 410 as a 'ghosted character' 450 or a preview of the current selection 445.

Figure 5:
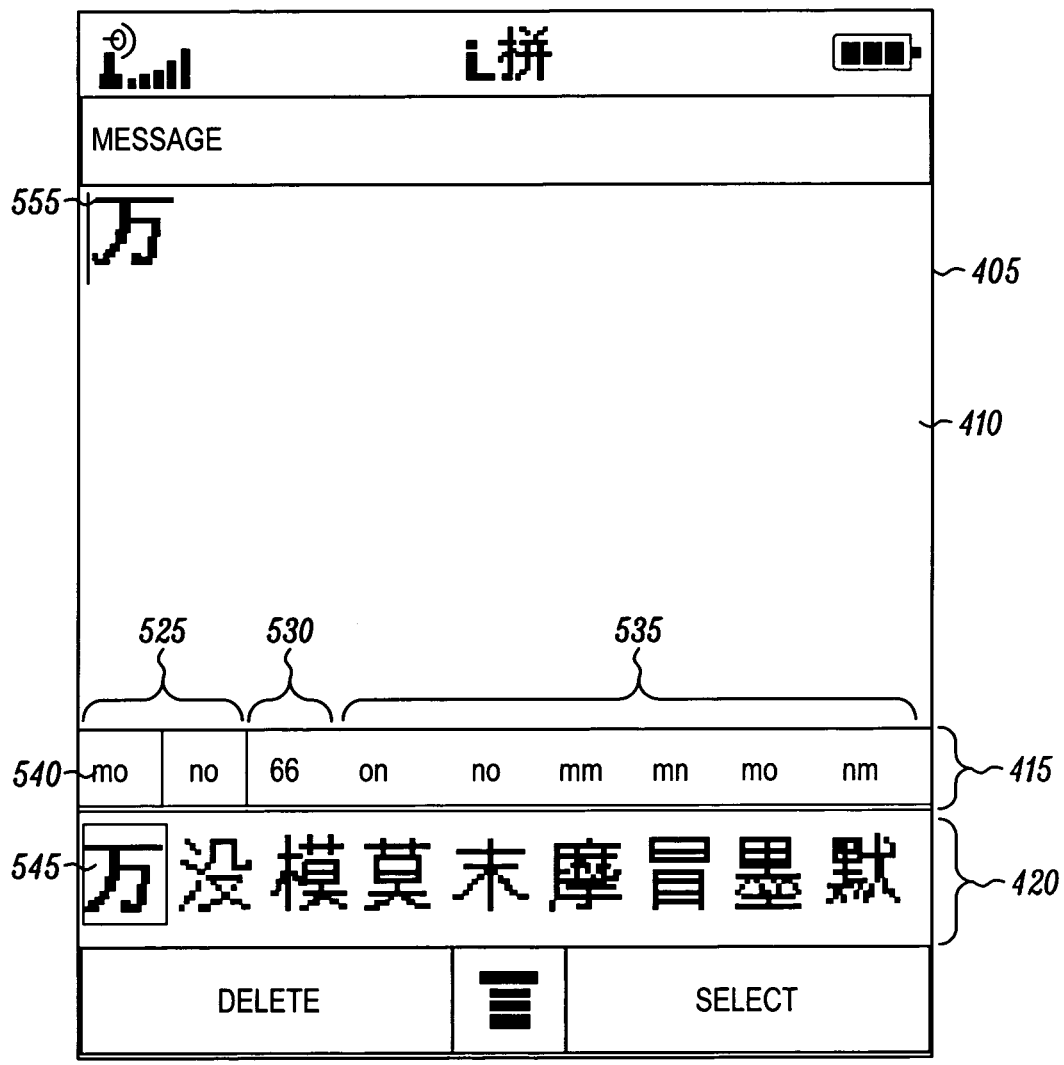
FIG. 5 illustrates an example of a screenshot of the display of FIG. 4 in an electronic device during a process of dynamic addition of characters or categories.
Figure 6:
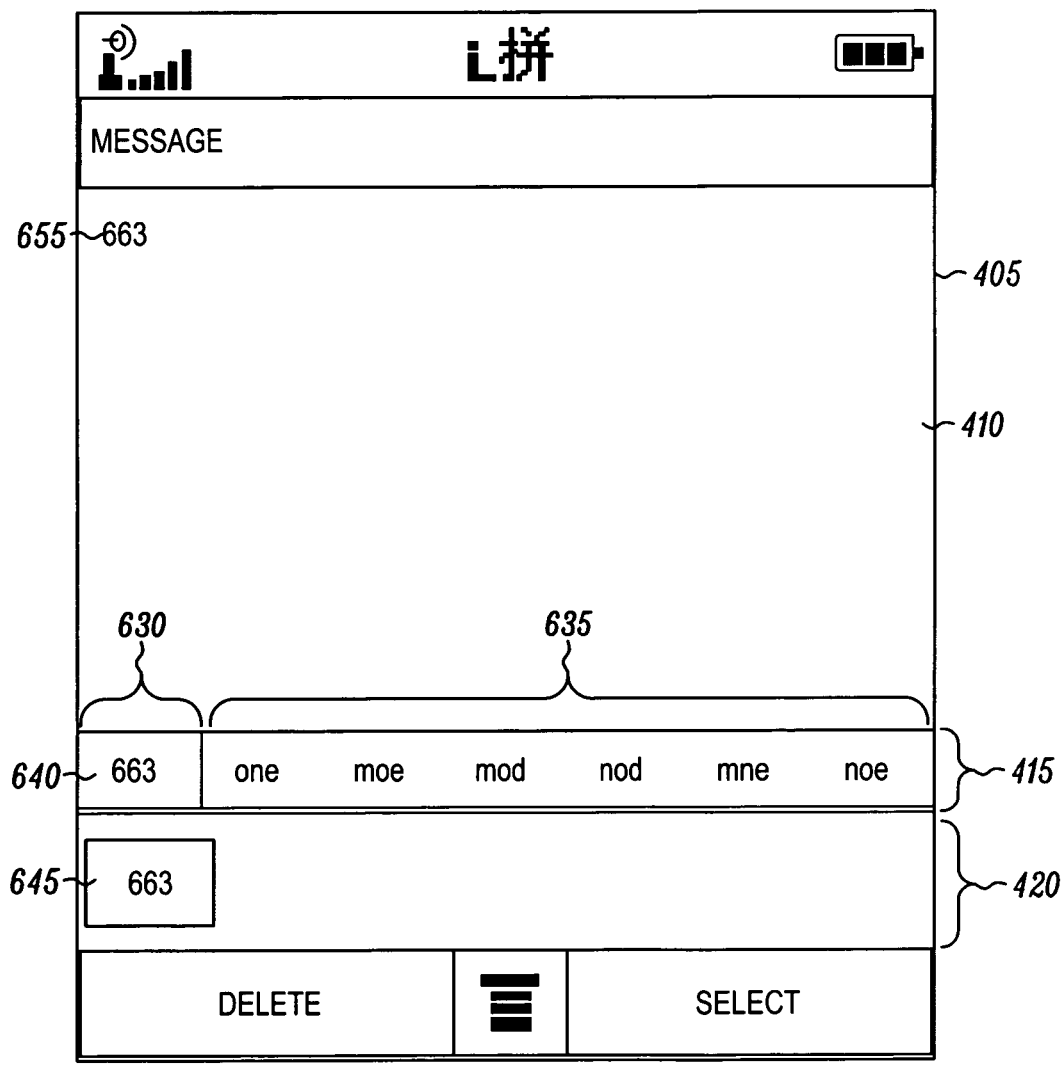
FIG. 6 illustrates an example of a screenshot of a display in an electronic device when there are no pinyins associated with the keystroke sequence.
Figure 7:
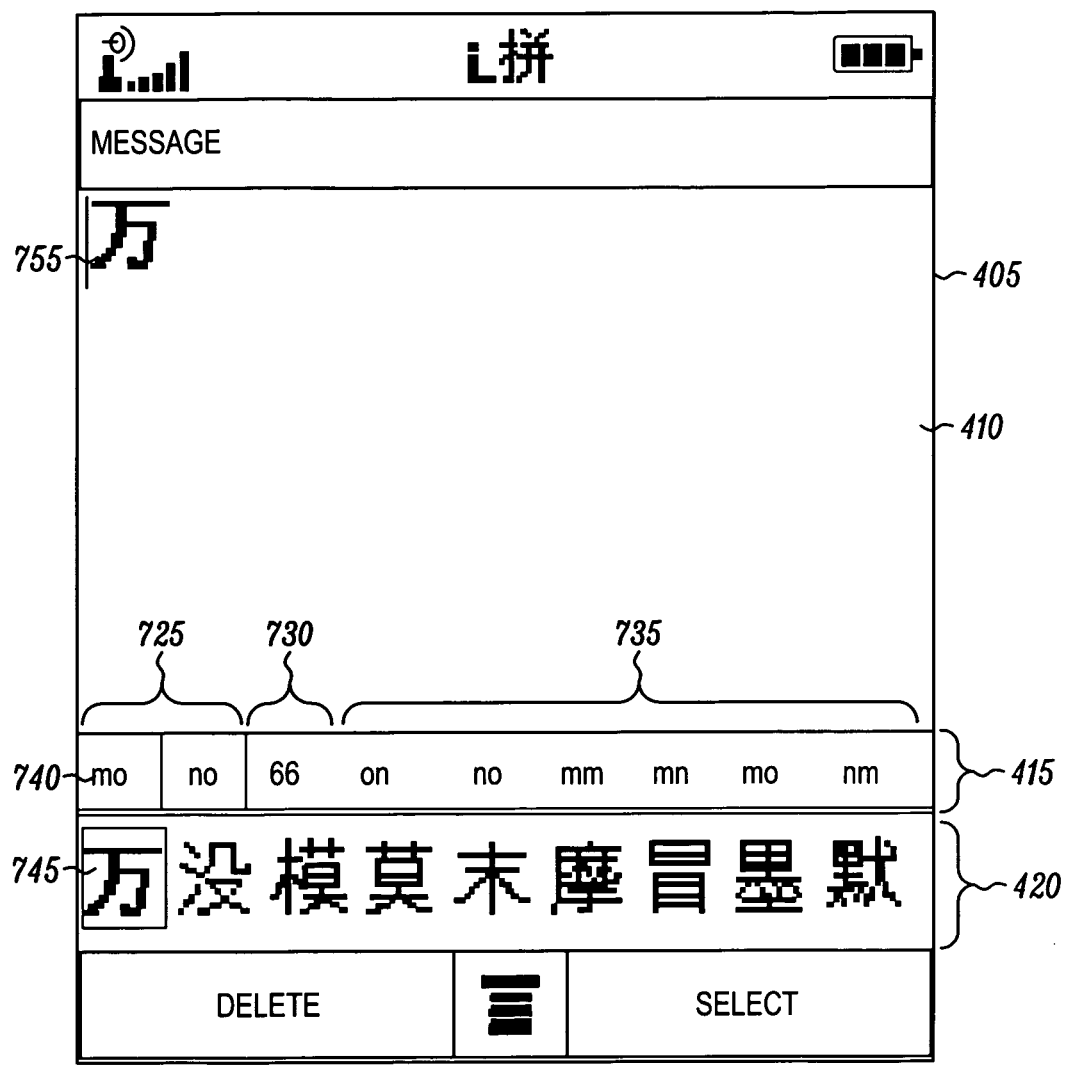
FIG. 7 illustrates an example of a screenshot of the display of FIG. 6 electronic device after the deleting the last keystroke.

The user can next enter another character such as the number 6 as shown in FIG. 5, by pressing the keypad and then selecting the character key sequence in numeric mode "66" by navigating or selecting through the plurality of modal interpretations displayed in the first display area 415. Based on this entry or selection, an interpretation of the first two entries is made and a new character conversion 545 is selected and displayed as a 'ghosted character' 555 or a preview of the current selection 545 in the text area 410. As shown in FIG. 6, when the user enters a number 3, the Chinese mode disappears, as there are no valid pinyins associated with the keystroke sequence. Thus, the user is automatically shifted into the numeric mode, since the interpretation for the keystroke sequence 663 does not have associated pinyins. Correspondingly, the contents of the second display area 420 change automatically to display a numeric string same as that displayed in the first display area 415.

When the user wishes to delete the last entry, the user can select the "delete" option in the display, and the display then displays the previous categories of modal interpretation 725, 730 and 735 and previous character key sequence result 745, similar to that as shown in FIG. 5. Therefore, the default modal interpretation again would be automatically set to Chinese by highlighting the first available element within the Chinese section.

Figure 8:
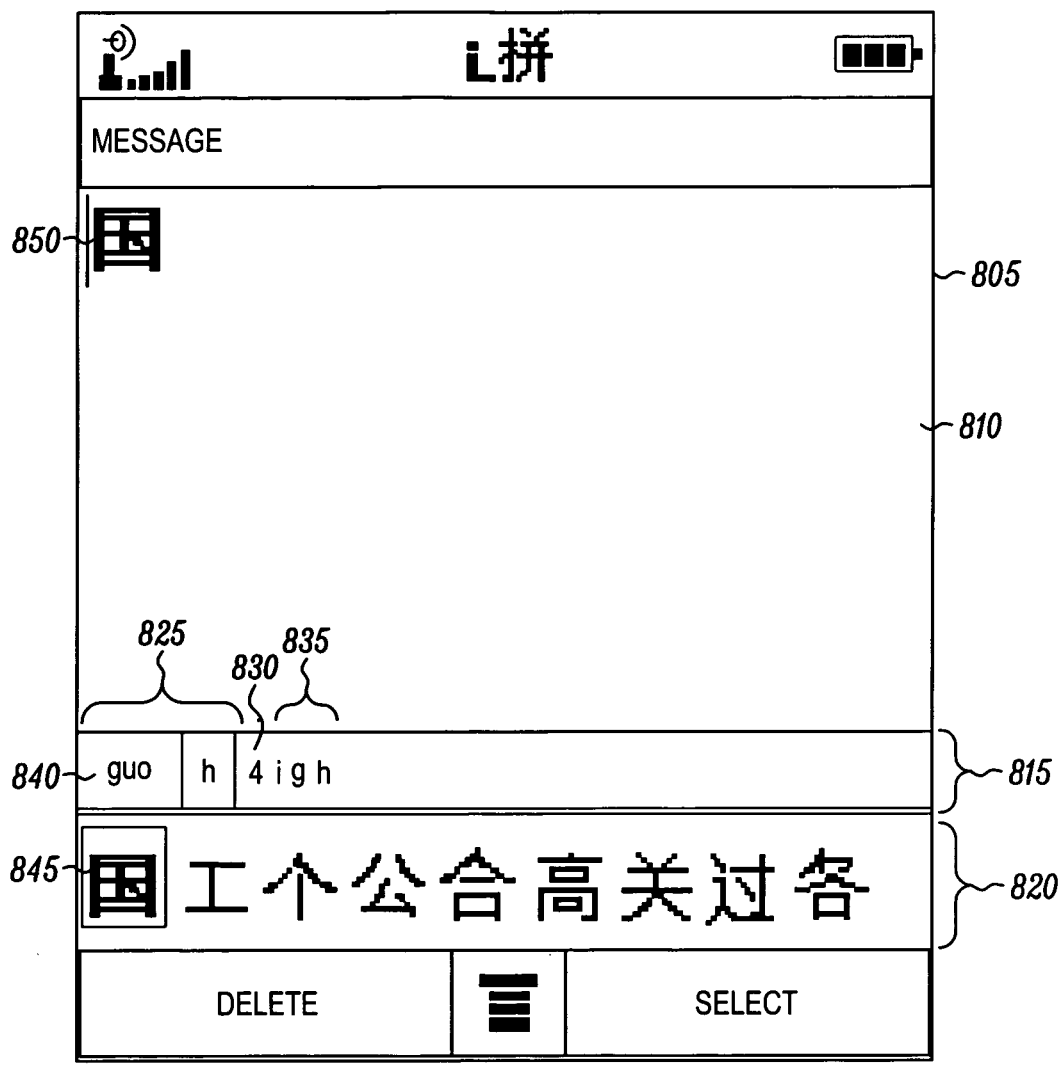
FIG. 8 illustrates an example of a screenshot of a display in an electronic device after one character has been entered.

FIGS. 8, 9, 10, 11, 12, and 13 illustrate various embodiments related to the process of navigation and mode selection or a-priori mode locking. FIG. 8 illustrates an example of a snapshot of a display 805 in an electronic device. When a user enters a character '4', a first display area 815 displays a plurality of modal interpretations 825, 830 and 835 and a second display area 820 displays one or more of a character key sequence result. By default, in this embodiment, character 840 has been selected or highlighted, which results in the default selection of the 825 modal interpretation. Similarly, by default and a predetermined interpretation, character conversion 845 has been highlighted or selected from a plurality of character key sequence results.

Figure 9:
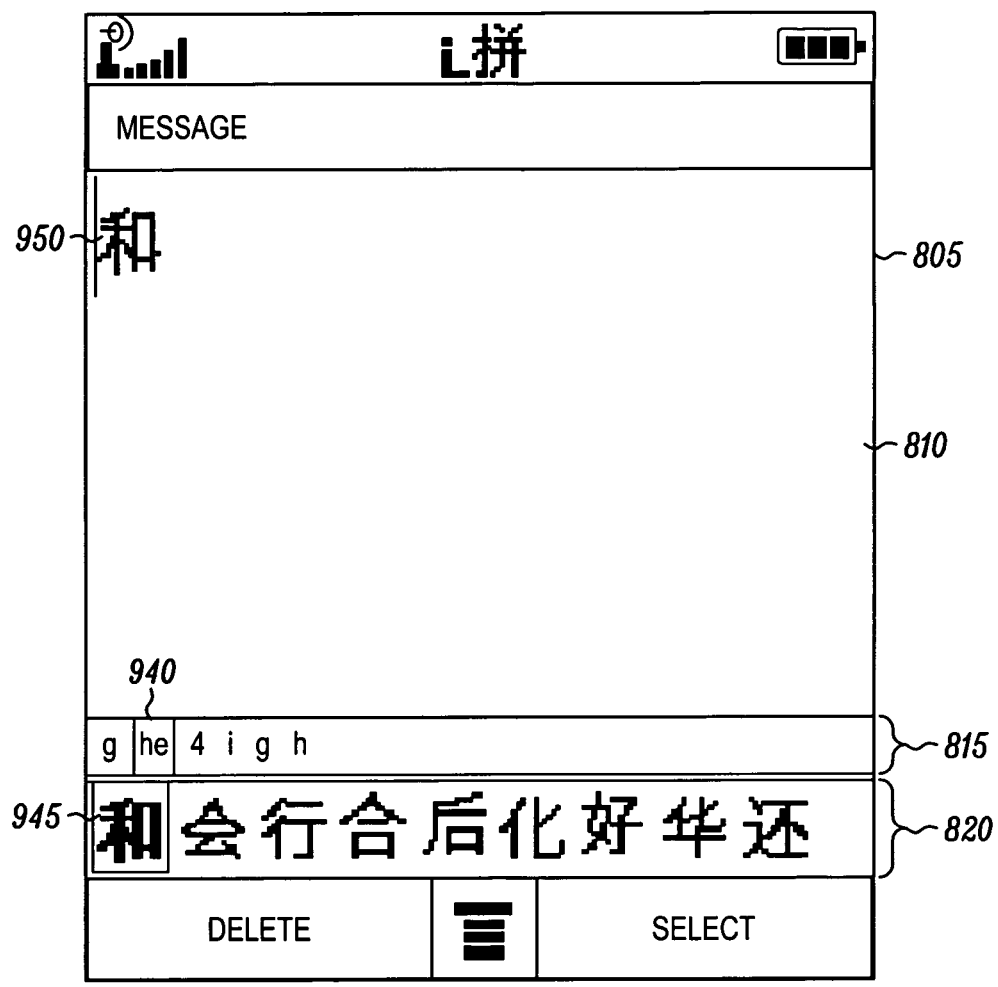
FIG. 9 illustrates an example of the screenshot of the display from FIG. 8 after using the navigation key.
Figure 10:
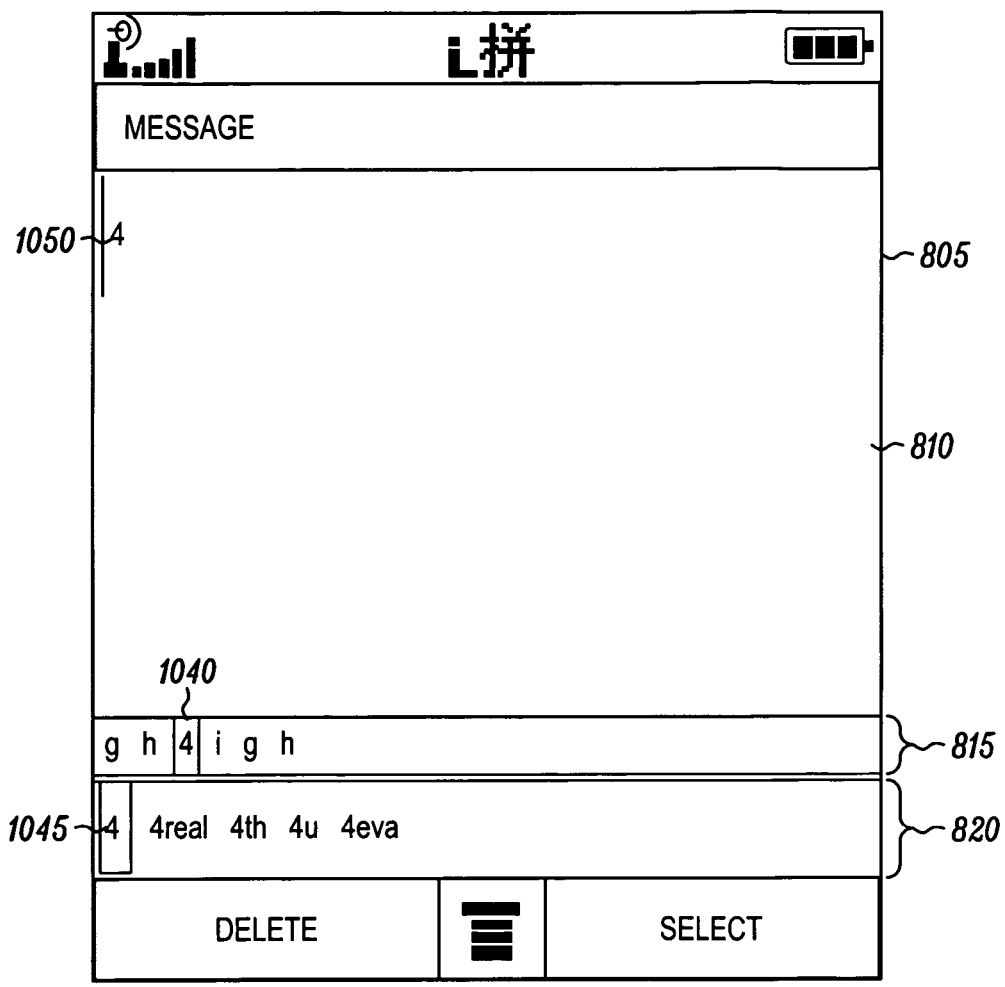
FIG. 10 illustrates an example of the screenshot of the display from FIG. 9 after using the navigation key.
Figure 11:
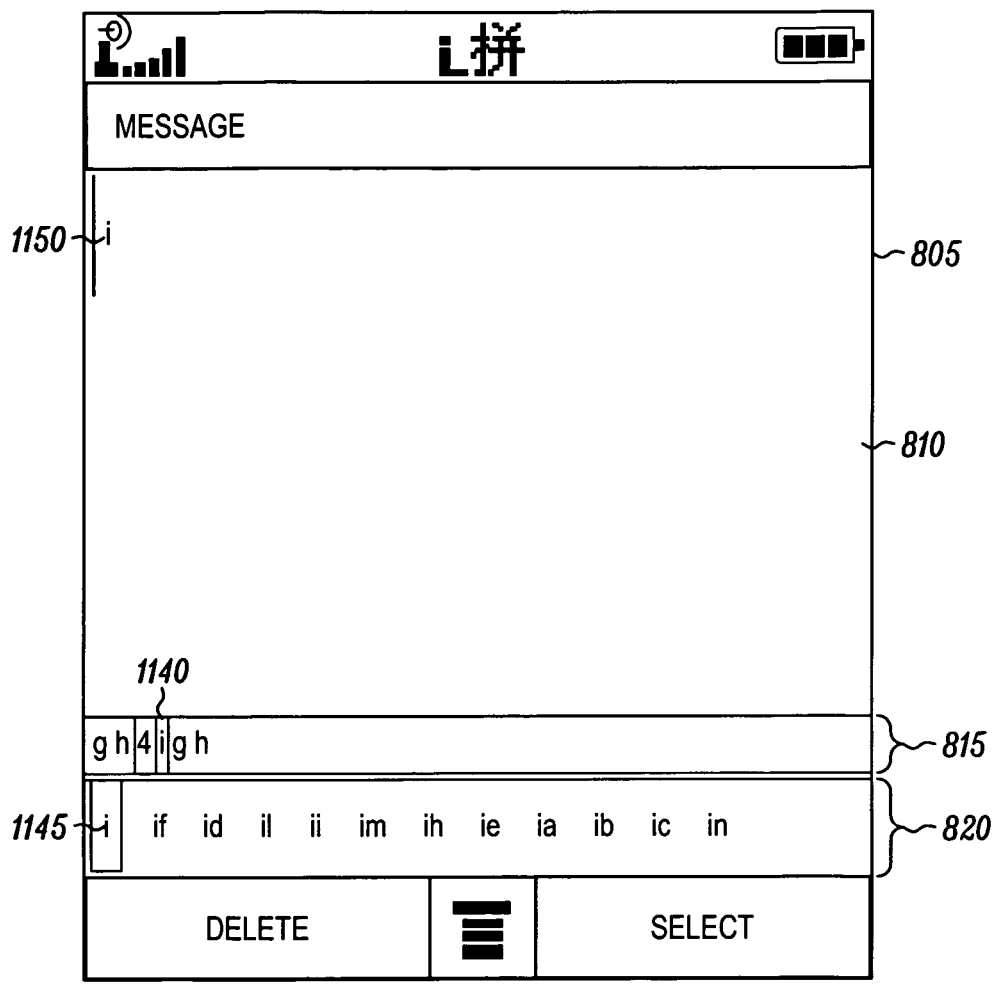
FIG. 11 illustrates an example of the screen shot of the display from FIG. 10 after using the navigation key.

The user can navigate through the plurality of modal interpretations by using a navigation key. As shown in FIG. 9, when the navigation key is pressed once to the right, a second character 940 is selected or highlighted. Correspondingly, a new plurality of character key sequence result is generated and based on a predetermined interpretation of the highlighted character 940, a character conversion 945 is highlighted from the plurality of character key sequence result. The user presses the navigation key to move across the plurality of modal interpretations as shown in FIG. 10 and FIG. 11, where each subsequent character 1040 and 1140 is highlighted and correspondingly, a new character key sequence result 1045 and 1145 is highlighted.

Figure 12:
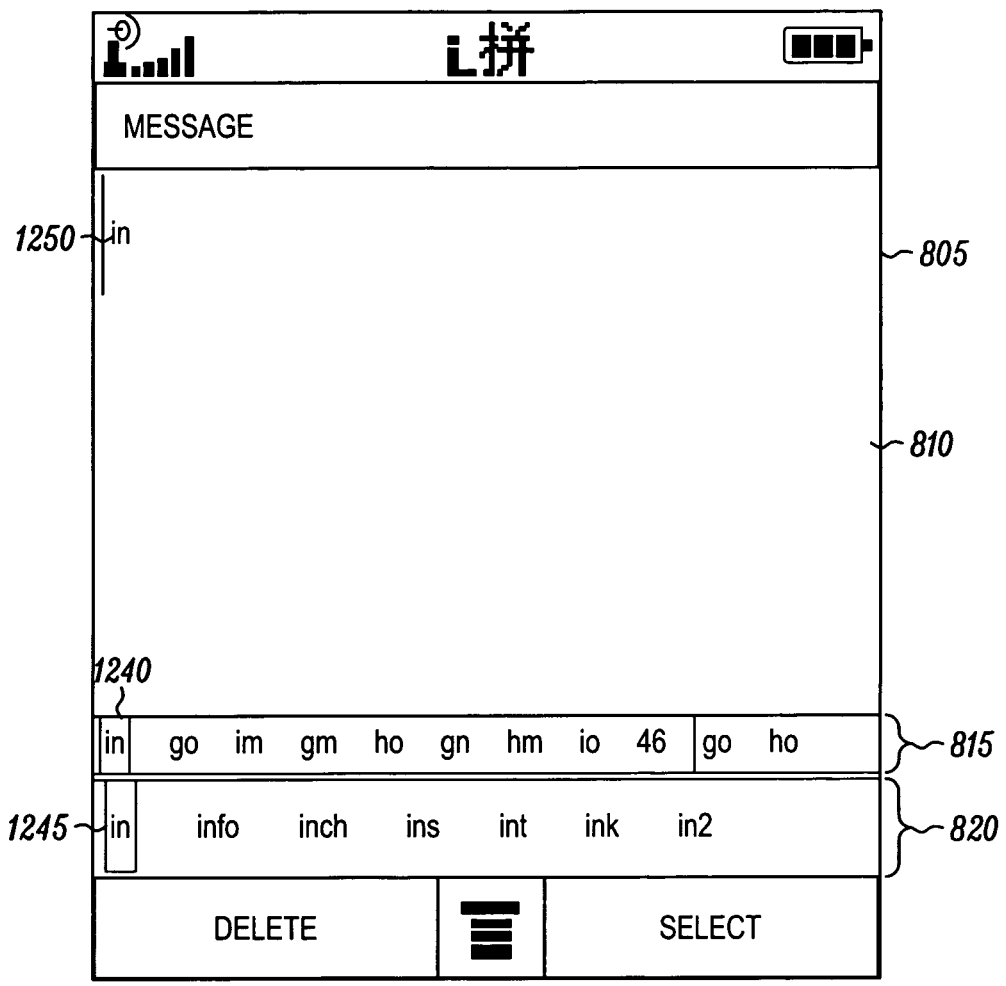
FIG. 12 illustrates an example of the screenshot of the display from FIG. 11 after adding a character to lock into a Roman mode.

When the user enters a character '6' after arriving at character 1140, the user input locks the selection in the Roman mode, and as a result, a new character 1240 and a new character key sequence result 1245 are highlighted, as shown in FIG. 12. Therefore, by selecting a specific modal interpretation and entering characters, the mode is set to a mode corresponding to the specific modal interpretation selected. Those skilled in the art will appreciate that the user input can be provided by various other methods for setting the default mode of input.

Figure 13:
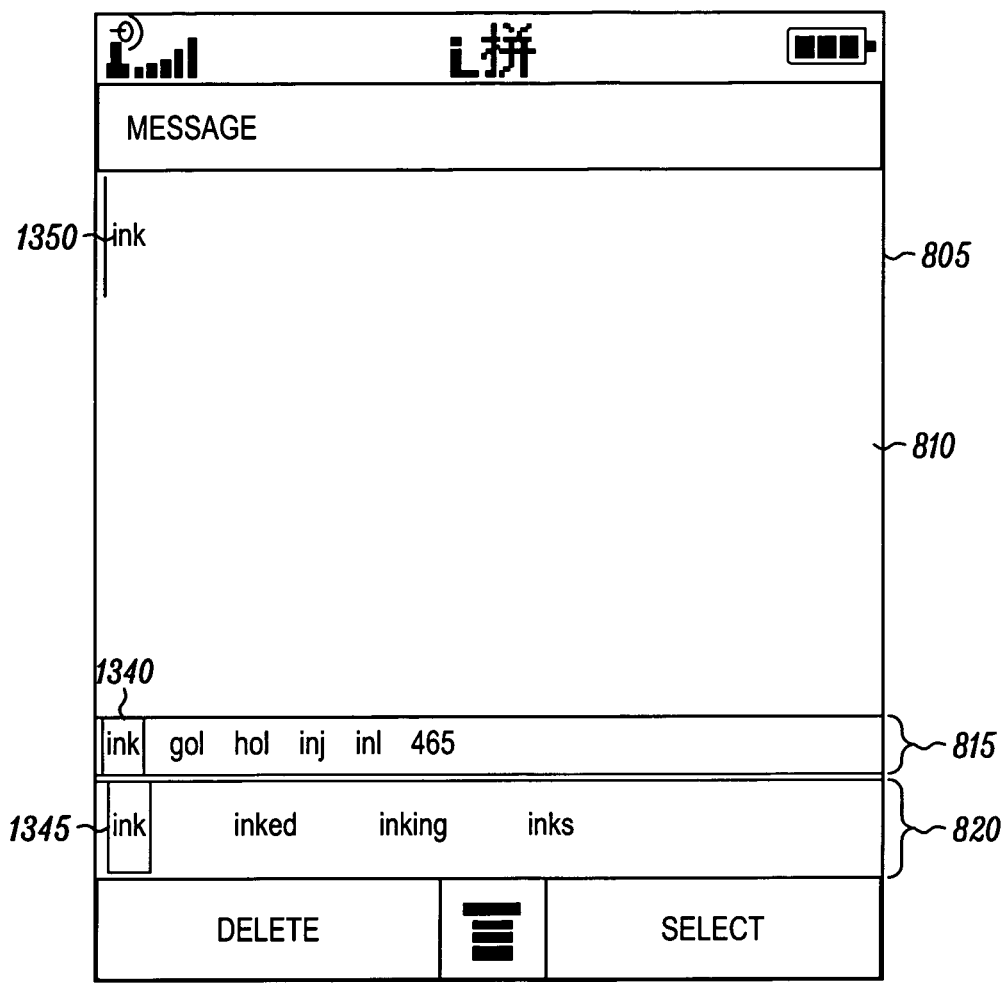
FIG. 13 illustrates an example of the screenshot of the display form FIG. 12 after adding a character.

Thereafter, when the user enters a character '5', there is a further change in the display in the first display area 815, as shown in FIG. 13, wherein a new character 1340 is highlighted and a change in the display in the second display area, which has reduced number of character key sequence results and the most probably character key sequence result 1345 is highlighted. The text area 810 also reflects all the changes and displays a preview of the most current or highlighted character key sequence result, 1350 in FIG. 13.

Figure 14:
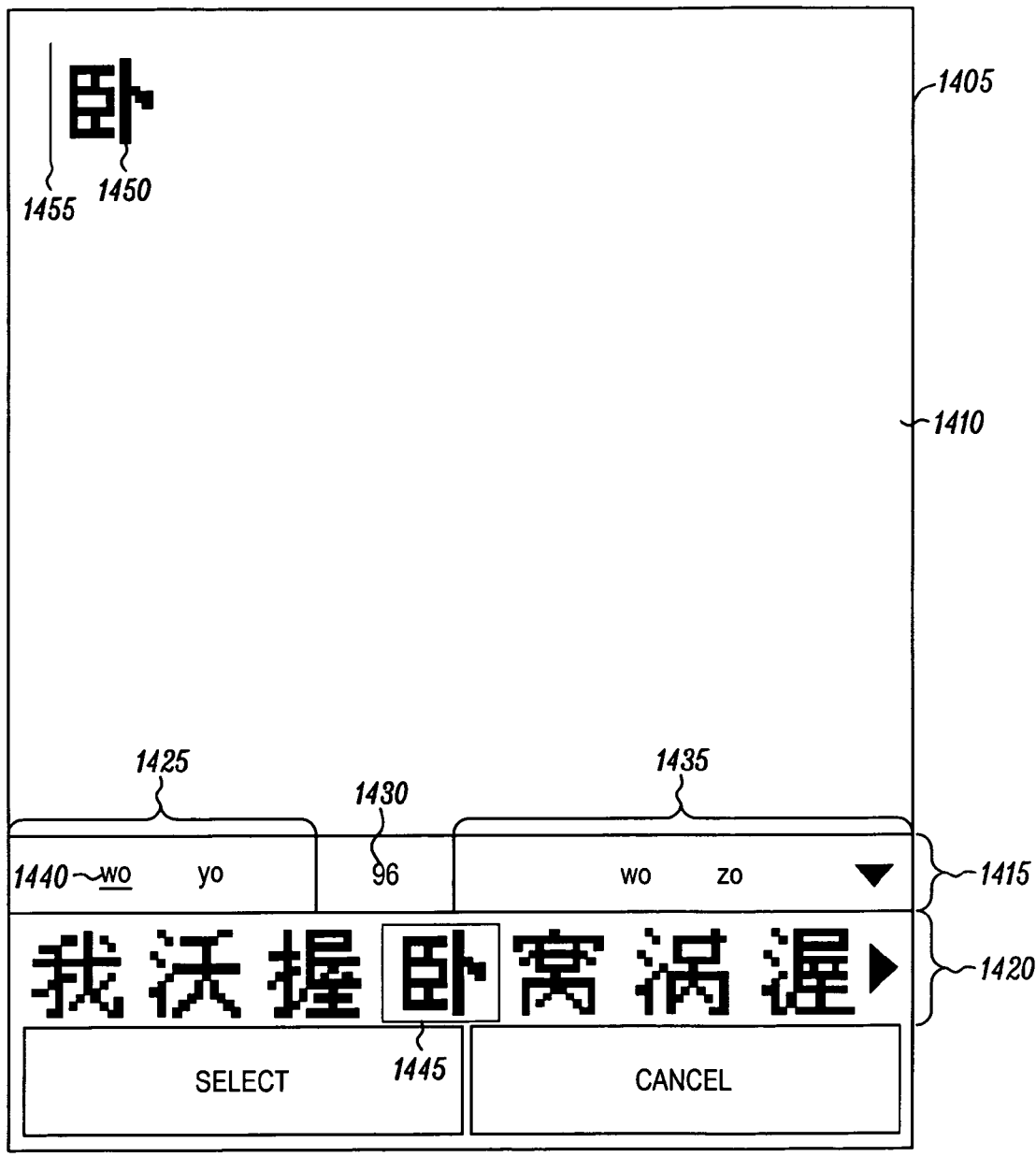
FIG. 14 illustrates an example of a screenshot of a display after highlighting a character key sequence result.
Figure 15:
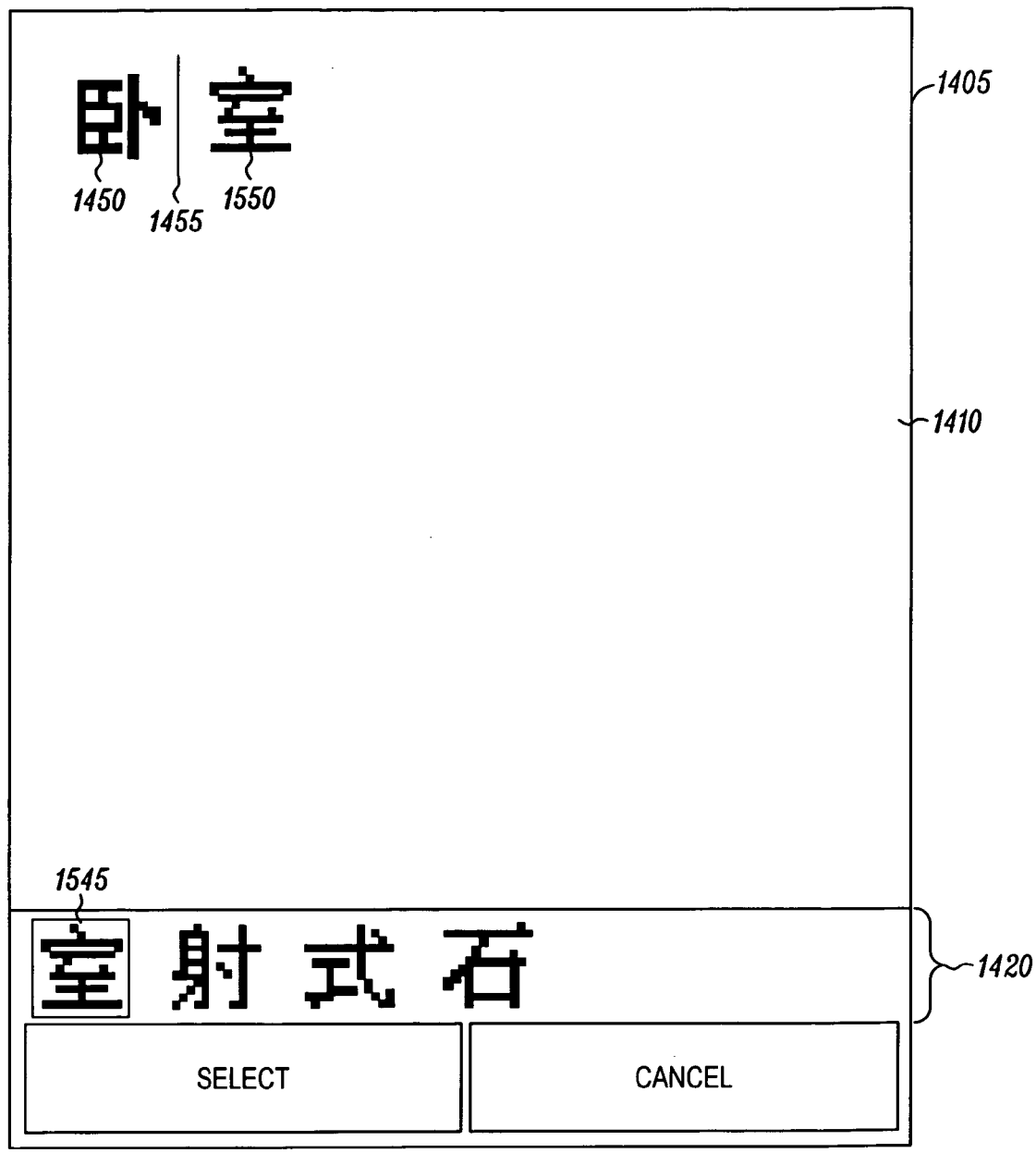
FIG. 15 illustrates an example of the screenshot of the display of FIG. 14, after selecting the highlighted character key sequence result.

Based on the entry and the interpretation of the entered characters, when the user sees a word or character of desired result or outcome, he can select the particular character sequence result 1445 from the second display area 1420, as shown in FIG. 14. Once the user makes a selection, as shown in FIG. 15, the character or word is committed in the text area and displayed as 1450. The cursor prompt 1455 moves ahead and based on another predetermined interpretation, a new 'ghosted character' 1550 or preview appears in the text area 1410 and awaits selection or deletion. Further, the first display area 1415 that provides the modal interpretations can be scrolled to display modal interpretations in addition to those displayed on the screen. Similarly, the second display area 1420 can be scrolled to display additional character conversions, numeric strings or word completions in addition to those displayed on the screen. The features of navigation, selection and committing can be used through keystrokes on keys available in the electronic device without any additional user input requirements. In a preferred embodiment of the invention, wherein the electronic device comprises a mobile telephone, the navigation can be done by using the navigation keys of the mobile phone and the committing can be done by using a key such as a center select key. Those of skill in the art will appreciate that the navigation, selection and committing process can be implemented by other methods such as overloading the existing keys of the user input or an equivalent.

In addition to the features described above, an electronic device can provide other features. These features can include, for example, setting the case for the characters. A user can set the case to either lower case, upper case by using the "Up" navigation key or caps lock. The user can input symbols in multi-modal content by pressing the "*" key.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method within an electronic device for interpreting one or more user inputs, the method comprising:
   receiving a first character input via a user input;
   concurrently displaying at least three modal interpretations for a numeric character set and a plurality of languages associated with the first character input;
   selecting one of the at least three of modal interpretations; and
   displaying a first character result in response to the selecting,
   wherein the first character result is selected from a character conversion, a numeric string, and a word completion associated with the first character input.

2. The method of claim 1, wherein the electronic device includes a physical text input facility, wherein the user input comprises an action coupled to the text input facility.

3. The method of claim 1, wherein the electronic device includes a display, and further wherein the at least three modal interpretations and the first character result are displayed on the display.

4. The method of claim 3, wherein the display comprises a plurality of display areas, and further wherein the at least three modal interpretations is displayed in a first display area of the display.

5. The method of claim 4, wherein the first character result is displayed in a second display area of the display.

6. The method of claim 1, further comprising:
   receiving a second character input via the user input;
   interpreting the first character input and the second character input to generate a second character result; and
   displaying the second character result.

7. The method of claim 6, wherein the second character result comprises one of a second plurality of: character conversions, a second numeric string, and a second plurality of word completions.

8. The method of claim 1, further comprising:
   receiving a second character input via a user input;
   interpreting the first character input and the second character input combination; and
   removing one of the at least three modal interpretations based on a result of the interpreting.

9. The method of claim 1, further comprising:
   deriving the at least three modal interpretations from a dictionary prior to the concurrently displaying.

10. The method of claim 9, further comprising:
    updating the dictionary in a multi-TAP mode to include one or more additional words.

11. The method of claim 1, wherein the at least three modal interpretations comprise: a Roman script language, a numeric character set, and a non-Roman script language.

12. The method of claim 11, wherein the non-Roman language comprises one or more of: a Chinese language, a Japanese language, a Korean language, an Indian language, a Farsi language, and a Hebrew Language.

13. The method of claim 11, wherein the user input comprises a plurality of input methods for interfacing using the non-Roman language.

14. The method of claim 13, wherein the non-Roman language comprises a Chinese language, and further wherein the plurality of input methods comprise one or more of: a PinYin input method, a BoPoMoFo input method, and a key-stroke input method.

15. A method of entering multi-mode content in an electronic device, the method comprising the steps of:
  entering at least one character; and
  selecting one of at least three modal interpretations for a numeric character set and a plurality of languages, based on the at least one character; and
  displaying a character key sequence result in response to the selecting, wherein the character key sequence result is selected from a character conversion, a numeric string, and a word completion.

16. The method of claim 15, further comprising the step of:
  setting a mode by selecting from the at least three modal interpretations.

17. The method of claim 15, wherein the selecting step further comprises:
  choosing one or more of the at least three modal interpretations from a character conversion, a numeric string, and a word completion to give a final selection.

18. An electronic device enabling entry of multi-modal content comprising:
  a user interface;
  a display; and
  a processing unit coupled between the user interface and the display, wherein the processing unit:
    receives a user input via the user interface,
    causes at least three modal interpretations for a numeric character set and a plurality of languages and a character sequence result to be displayed concurrently on the display,
    receives at least one other user input via the user interface,
    processes the at least one other user input to provide a selection between the at least three modal interpretations and the character sequence result, and
    causes a final selection to be displayed on the display,
  wherein the character sequence result comprises one or more of: a character conversion, a numeric sequence, and a word completion.

* * * * *